United States Patent [19]
Emery

[11] Patent Number: 5,095,995
[45] Date of Patent: Mar. 17, 1992

[54] SHAPING TOOL

[76] Inventor: Leslie M. Emery, 1901 S.W. Childs Rd., Lake Oswego, Oreg. 97034

[21] Appl. No.: 578,084

[22] Filed: Sep. 5, 1990

[51] Int. Cl.⁵ .............................................. A01L 11/00
[52] U.S. Cl. ......................................... 168/45; 59/56; 72/387
[58] Field of Search ................ 168/45; 59/56; 72/176, 72/387

[56] References Cited

U.S. PATENT DOCUMENTS 306,285 10/1884 Rigby et al. ...................... 59/56 X
3,874,165 4/1975 Dawson .................................. 59/56

FOREIGN PATENT DOCUMENTS 53246 10/1933 Norway ................................ 72/387

Primary Examiner—Robert P. Swiatek
Attorney, Agent, or Firm—Lyon & Lyon

[57] ABSTRACT

A shaping tool has first and second handles pivotally joined at jaws on the handles. Bending blocks are eccentrically and releasably fixed to the jaws of the handles. The bending blocks may be rotated to adjust spacing. A bracing block and a center block may also be fixed onto the jaws to provide additional versatility.

15 Claims, 3 Drawing Sheets

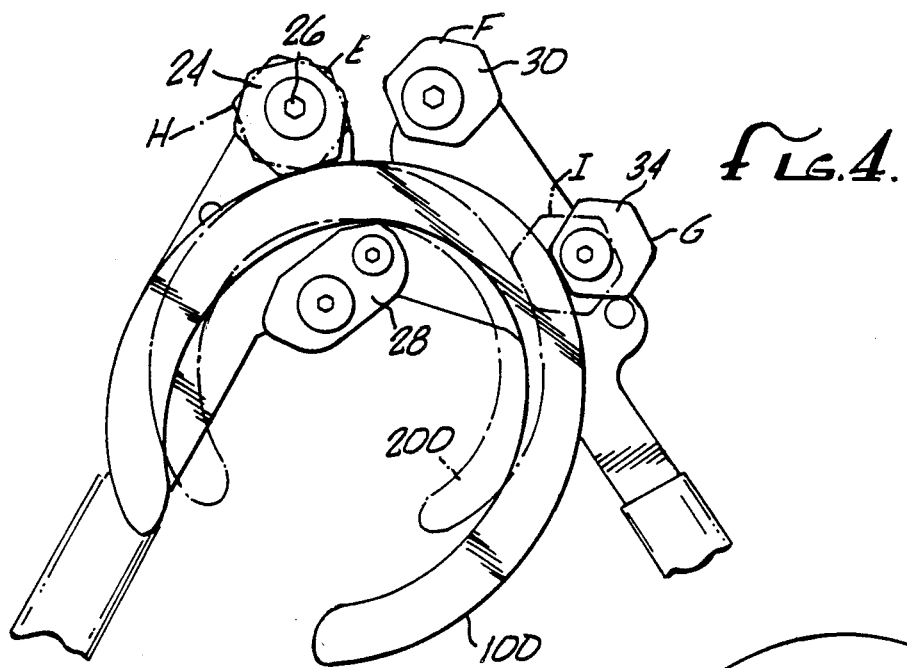
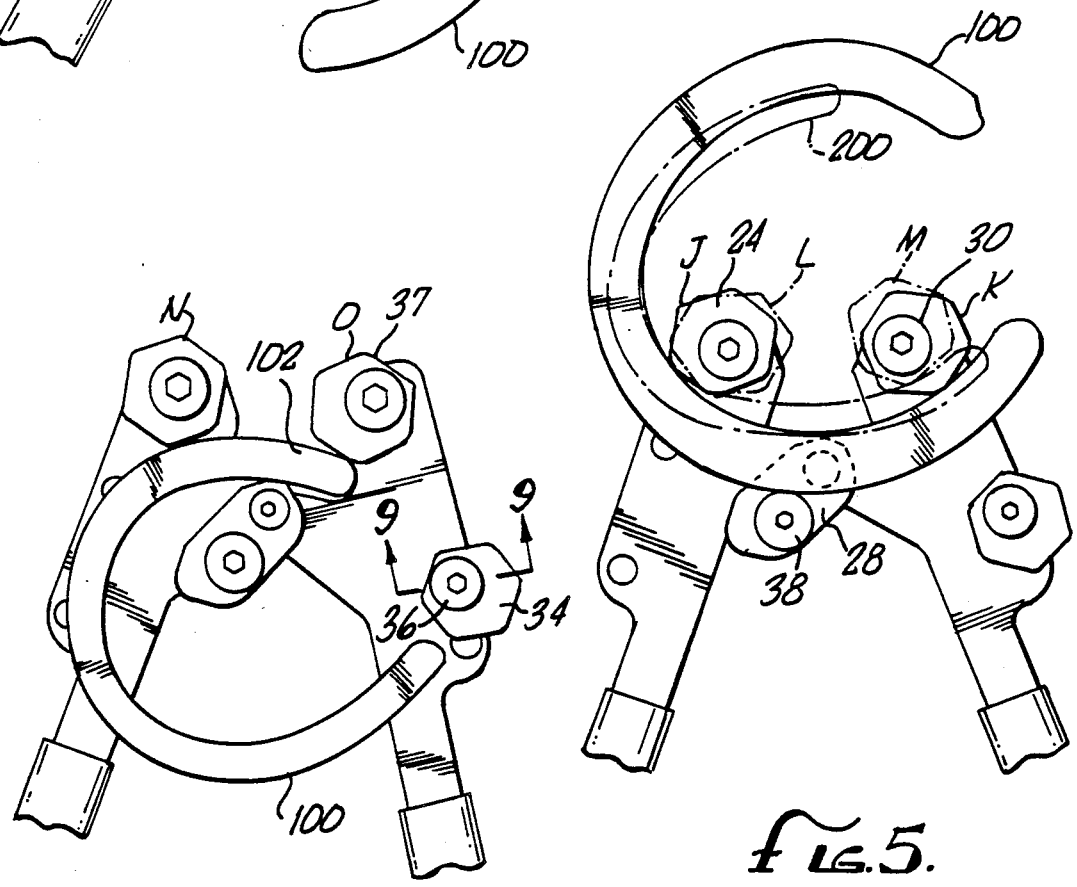

SHAPING TOOL

BACKGROUND

1. Field of Invention

The invention relates to a shaping tool.

2. Prior Art

The traditional tools used by a farrier to shape an individual horseshoe so that it snugly fits the horse's hoof are the hammer and anvil. In a typical shoeing operation, the hooves of the horse to be shod are first cleaned, cut and trimmed. Any irregularities in the shape of the hoof are reduced to the extent possible. Then, the farrier will either use standard pre-formed shoes, or, on occasion, a farrier may form his own shoes from straight bar stock. In either event, the shoes must then be fitted to each individual foot on each individual horse. It is highly unusual that two or more of the hooves on any one horse will accept the same size and shape shoe. Further, it is highly unusual for any horse's hoof to accept the standard shoe without some further shaping. Accordingly, in virtually every instance, some shaping of the shoe must be done by the farrier before it is attached to the horse's hoof.

The procedure typically begins with the farrier placing the standard or his personally formed shoe against the horse's hoof and making a mental note of the modifications needed to the shape of the shoe to conform it to the shape of the hoof. The farrier will then take the shoe to the anvil and by placing the shoe in various positions on the anvil and striking the shoe repeatedly with the hammer, modify the shape of the shoe. This process involves repetitively removing the shoe from the anvil after several blows have been administered to check the amount of deformation. The shoe is then again fitted to the horse's hoof, and, in most instances, the process is repeated several times until an exact fit is accomplished. This will typically require several "sightings" of the shoe against the hoof to check for fit. Each such sighting requires that the farrier walk from the location where he has his hammer and anvil back to where the horse is located; the farrier must then position himself under the horse, raise the horse's hoof, compare the fit, put the horse's hoof back on the ground and walk back to the anvil for further modifications.

As the shape of the shoe approaches the shape of the hoof, the modifications may be quite slight, such that the entire operation of raising the horse's hoof, checking the fit, putting the horse's foot back down and walking back to the anvil is undertaken simply to make a very minor adjustment. This is not only time consuming but can be irritating to the horse, and exhausting to the farrier who must repetitively position himself under the horse and pick up the horse's hoof. It is not unusual for horses to lean against the farrier during this operation, such the farrier's work load is substantially increased.

Another drawback to the use of the hammer and anvil is that a farrier does encounter instances when it is impossible, or highly difficult, to transport the hammer and anvil to a location near the horse.

Emery, U.S. Pat. No. 4,573,339 discloses a manual tool for shaping individual horseshoes (known as the "pocket anvil" design). This design has certain plugs and flanges. The plugs and flanges can be brought to bear upon the horseshoe positioned within the tool to shape the horseshoe.

The pressure or contact points on the pocket anvil tool for bending, straightening, and leveling the sections of the steel bar which comprise a horseshoe are fixed in relation to each other on the jaws of the tool. This fixed relationship imposes a limitation on the range of width, thickness, and overall size of horseshoes which can be bent, straightened, or leveled effectively with this known tool. Consequently, three sizes of the prior art tool have to be manufactured to accommodate the range of horseshoes commonly used.

In addition, in operating the pocket anvil tool of U.S. Pat. No. 4,573,339, the tool handles may often be too far apart in bending large shoes and too close together in bending small shoes for efficient operation. Accordingly, it is an object of the invention to provide an improved tool for shaping horseshoes.

SUMMARY OF THE INVENTION

To this end, blocks of hexagonal steel rods rotate around holes drilled off center between their outer edges. These hex blocks thereby become "cams" rotating around fixed bolts threaded into the tool's jaws. Numerous combinations of gap spacings between bending, straightening, and leveling pressure points thus become possible This is achieved by varying positions of the hex blocks in relation to each other.

Rotation of the cam-like hex blocks not only changes the distance between pressure points on a line at right angles between their effective surfaces, but also alters the distance between them along parallel lines. This ability to move the pressure surfaces closer or farther apart in two directions greatly increases the efficiency of bending shoes of different widths.

Spreading of shoes, involves placing the outer edges of the hex bending blocks against the inner edges of the shoe. The rotating of the blocks to increase or decrease the actual distance between the shoe's outer edges increases the variability. The efficient positioning of the handles for optimum leverage is also aided by this adjustable distance in spreading the shoe.

It is therefore an object of this invention to provide a manual tool which has the capability to bend and straighten various shapes and widths of metal tubing and rods (round, square, hexagonal, hollow, solid) into desired shapes for a variety of purposes including the shoeing of horses. The function of the tool is greatly enhanced by the variable positions of the pressure points. The device of this invention can be utilized to great benefit in making bends at any degree and in close proximity on the same length of material. This is achieved by manipulating the relationship of the pressure points.

Further to these ends, a shaping tool for horseshoes has first and second handles pivotally joined together with a least two bending blocks attached to the tool. One or both of the bending blocks is eccentrically and releasably bolted to the handles, so that they may be adjusted depending on the function to be performed with the shaping tool and the size of the horseshoe or work workpiece. Preferably, the bending blocks are hexagonal. A bracing block may also be provided on one of the handles in a configuration similar to the bending blocks. A spreading knob may be provided on or both handles and a closing or straightening peg is preferably provided on the bottom side of the handles.

BRIEF DESCRIPTION OF THE DRAWINGS

In the drawings, wherein similar reference characters denote similar elements throughout the several views:

FIG. 4 is a top view fragment of the present tool illustrating the tool bending a large horseshoe (solid lines) and a small horseshoe (phantom lines);

FIG. 5 is a top view fragment of the present tool illustrating the tool straightening a large horseshoe (solid lines) and a small horseshoe (phantom lines);

FIG. 6 is a top view fragment of the present tool illustrating the tool bending the end or heel of a horseshoe.

DETAILED DESCRIPTION OF THE DRAWINGS

Figure 1:
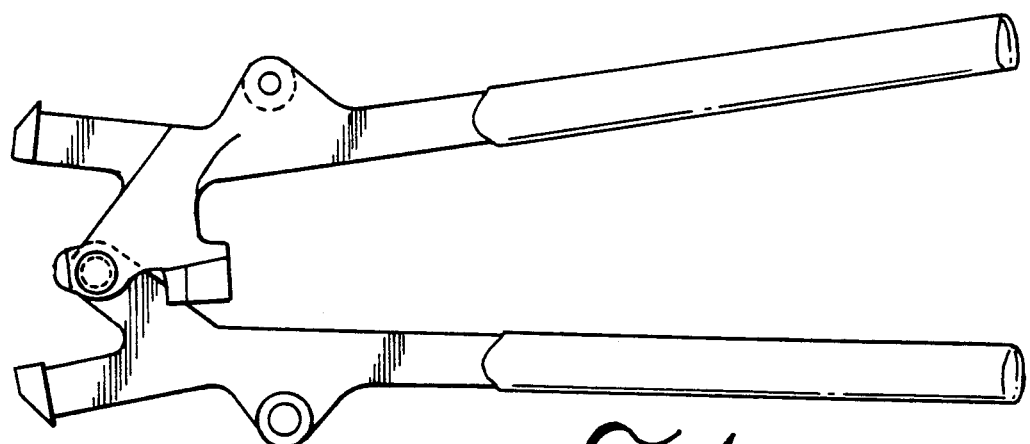
FIG. 1 is a top view of a known tool for shaping objects.
Figure 2:
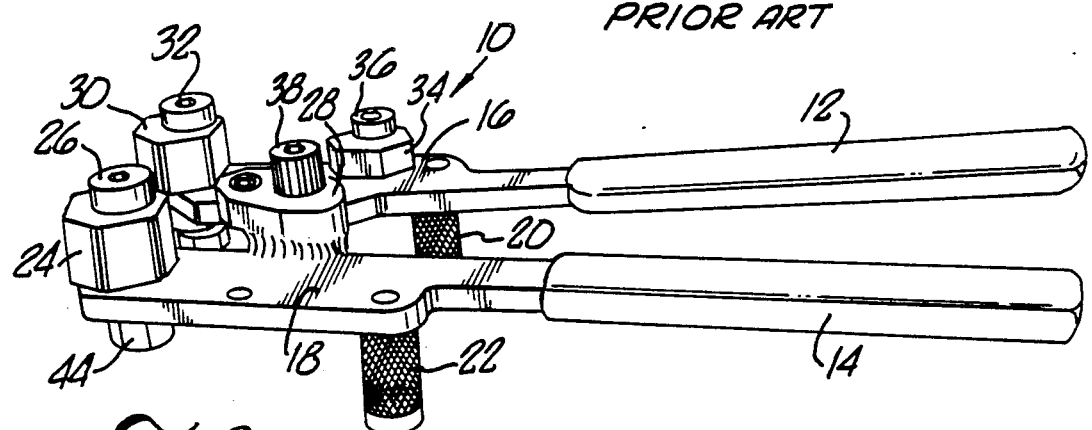
FIG. 2 is a perspective view of the tool of the invention.

As shown in FIG. 2, the present tool 10 has left and right handles 14 and 12. The left handle 14 has a left jaw 18. Similarly, the right handle 12 has a right jaw 16. Left and right closing pegs 22, 20 extend from the bottom side of the left and right handles 14, 12. A left hex bending block 24 is attached to the end of the left jaw 18 by a bolt 26 terminating in a left spreading knob 44 on the underside of the left jaw 18. Similarly, on the right jaw 16A right hex bending block 30 is attached with a bolt 32 threaded into a right spreading knob 42, with the left hex bending block 24 and right hex bending block 30 in general alignment with each other on opposite sides of the tool.

Figure 8:
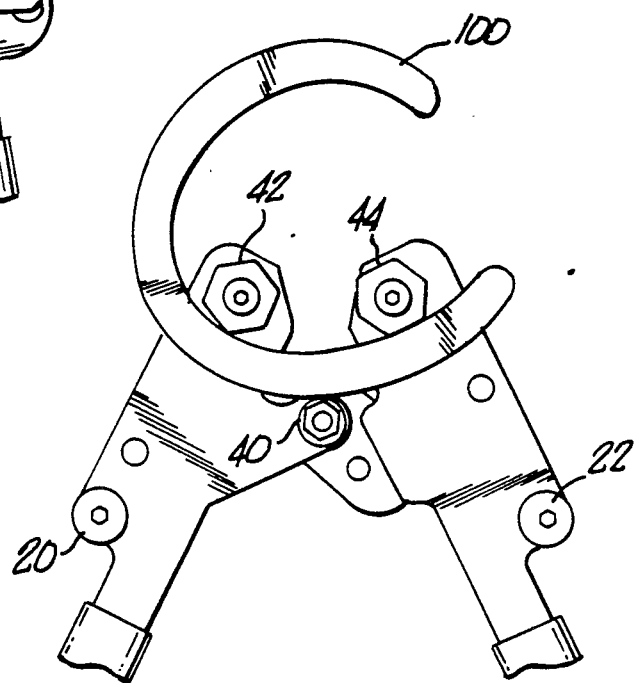
FIG. 8 is a bottom view of the present tool illustrating the tool straightening a horseshoe using the bottom or back of the tool.

A raised center block 28 is welded onto the left jaw 18. A front straightening peg 38 passes through the center block 28 and also through an extension of the right jaw 16, thereby providing a pivot point pivotally linking the left and right handles 14, 12. On the underside of the tool, a back straightening peg 40 extends coaxially with the front straightening peg 38 (FIG. 8).

Figure 3:
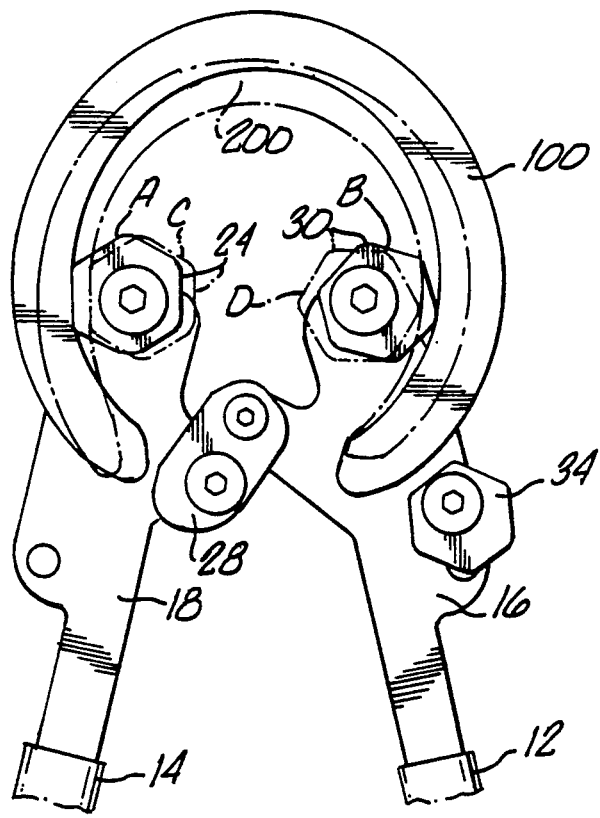
FIG. 3 is a top view fragment of the present tool illustrating how the tool can be used to spread a large horseshoe (solid lines) and a small horseshoe (phantom lines)

A hex bracing block 34 is secured to the right jaw 16 with a hex bracing bolt 36. The bolts 26, 32 and 36 securing the left and right bending blocks 24 and 30, and the bracing block 34 are spaced apart from each other and from the center block 28, as shown in FIG. 3. Preferably, the handles 14, 12 extend for approximately 14 inches from the center block 28 to provide sufficient leverage.

The bolts 26, 32 and 36 can be alternately tightened and released such that the bending and bracing blocks can be eccentrically pivoted about their mounting centers, i.e., the center line axis of the bolts. This allows the hex blocks to act as cams to provide numerous combinations of gap spacing for bending, straightening and leveling a workpiece by varying the positions of the hex blocks in relation to each other and to the center block 28.

In addition, by adjusting the hex blocks 24, 30 and 34, the handles of the tool 14, 12 can be consistently positioned within a range most effective for exerting force on the workpiece. Rotation of the hex blocks 24, 30 and 34 not only changes the distance between the pressure points (i.e., the contact points between the tool and workpiece) on a line at right angles between their effective surfaces, but also changes the distance between the pressure points along parallel lines. This ability to move the pressure points closer or farther apart in two directions greatly increases the efficiency of bending workpieces of different widths. For example, horseshoes of narrow width need to be gripped by pressure points closer together on both the vertical and horizontal axes, while wide shoes bend more efficiently between pressure points relatively further apart along the same axis. The same principle applies for straightening the sides of shoes and also to the function of leveling shoes.

Spreading of a workpiece or horseshoe is achieved by placing the outer edges of the hexagonal blocks 24, 30 and 34 against the inner edges of the workpiece. The blocks are rotated to increase or decrease the actual distance setting to engage the workpiece and to adjust the position and travel of the handles.

Figure 9:
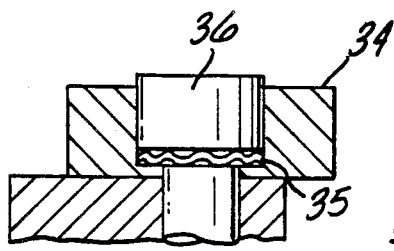
FIG. 9 is a section view fragment taken along line 9—9 of FIG. 6

Referring to FIG. 9, a wavy spring or washer 35 is disposed between the hex blocks 24, 30 and 34 and the bolts 26, 32 and 36. The bolts 26, 32 and 36 are tightened to partially compress the wavy washer 35, to the point that the hex blocks 24, 30 and 34 can be rotated with a moderate amount of force but are not loose. This allows the hex blocks to shift and rotate during use of the tool to permit a flat face of the hex block to rest flat against the shoe. Preferably, only flat faces of the hex blocks 24, 30 and 34 rest against the shoe or workpiece, thereby avoiding dragging the workpiece against the points or corners 37 of the hex blocks. In addition, as the workpieces bend, the spring force clamping contact provided by the wavy spring 35 allows the contacting flat face of the hex blocks to stay in contact with the workpiece throughout the bending sequence. This permits the tool to keep a solid grip on the workpiece material. The bolts 26, 32 and 36 are tightened enough to provide some spring force friction and clamping of the hex blocks 24, 30 and 34 but still allowing the hex blocks to be moved by hand. The points or corners of the hex blocks can be used in spreading or straightening a workpiece, i.e., on the inner arch of any curve, to provide a better grip. The corners of the hex blocks, which are hardened, can engage or bite into the inner surface of the workpiece.

As shown in FIG. 3, with the hex blocks 24, 30 in the A and B positions (solid lines), the tool is set up for spreading a large horseshoe 100. Conversely, with the hex blocks 24, 30 in the C and D positions (phantom lines) a small horseshoe 200 (phantom lines) is readily spread.

FIG. 4 illustrates bending of a horseshoe. As shown therein, with the hex bending blocks 24 and 30 in positions E and F, and with hex bracing block 34 in position G, a large shoe 100 undergoes bending. The right hex bending block 30 is not used and is not in contact with the shoe 100. The left hex bending block 26 and the bracing block 34 (in positions E and G) bend the shoe 100 over the center block 28. To work on a small shoe 200, the left hex bending block 24 is moved from position E to position H by loosening the left hex bending block bolt 26, rotating the left hex bending block 24 into position H and then tightening the bolt 26. The hex bracing block 34 is similarly adjusted from position G to position I as shown in FIG. 4. The small shoe 200 can then be bent with the tool handles remaining in a preferred working range.

FIG. 5 illustrates straightening both large and small shoes. To straighten a large shoe 100, the left hex bending block 24 is secured into position J and the right hex bending block 30 is secured into position K. As shown, the left and right hex bending blocks 24, 30 engage the inside surface of the shoe 100, with the outside surface butting against the front straightening peg 38. As the handles 12, 14 are brought together, the left and right hex bending blocks 24, 30 straighten the side of the shoe 100 against the front straightening peg 38. The bracing block 34 is not used.

To perform the same operation on a small shoe 200, the left hex bending block 24 is put into position L and the right hex bending block 30 is secured into position M, with the left and right hex bending blocks 24, 30 engaging the inside surface of the shoe 200. The outside surface of the shoe 200 butts against the forward portion of the center block 28.

FIG. 6 illustrates the tool set up to bend or heel of a horseshoe. The left and right hex bending blocks 24, 30 are put into positions N and O, respectively, with the inside surface of the horseshoe 100 secured against the center block 28. As the handles of the tool are brought together, the heel 102 is bent inwardly.

Figure 7:
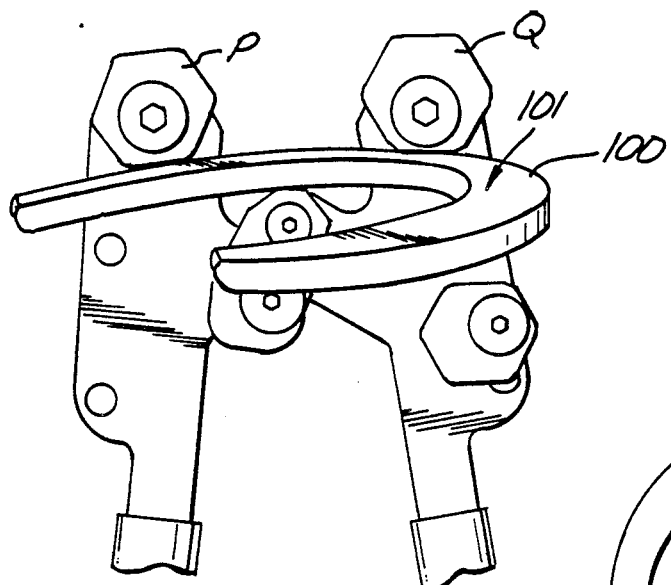
FIG. 7 is a perspective fragment view of the present tool illustrating the tool leveling a horseshoe.

FIG. 7 illustrates leveling or flattening a shoe 100 with the left and right hex bending blocks 24, 30 secured into positions P and Q against the bottom surface 101 of the shoe 100 with the shoe "upside down" in the tool 10, the center block 28 presses against the top surface of the shoe 100.

FIG. 8 illustrates straightening a horseshoe 100 on the back of the tool 10. A left spreading knob 44 and a right spreading knob 42 extend from the underside of the tool. The horseshoe 100 is placed in between the left and right spreading knobs 44, 42 and the back straightening peg 40. As the tool handles are brought together, the shoe 100 is straightened. The spreading knobs 44, 42 preferably are large nuts on the ends of 5/8" thick shoulder bolts which secure the left and right hex bending blocks 24, 30 to the jaws 18, 16 of the tool 10. The spreading knobs or nuts 44, 42 provide an additional set of shoe spreading points. Since the proximity of these pressure points is different from those on the front of the tool, the back straightening points offer additional variations.

Spreading the forks of the horseshoe is required when the hoof of the horse to be shod is wider than the standard size shoe. When the hooves are more rounded then the shape of a standard preformed horseshoe, the shoe must be bent into a tighter radius, as shown in FIG. 4. On the other hand, to fit a hoof which is less rounded than the standard preformed shoe, the shoe must be straightened, as shown in FIG. 3.

Of course, the tool can also be analogously used to shape tubing, rods, bars, etc.

Having shown and described the preferred embodiment of the invention, it will be apparent to those skilled in the art that many modifications could be thereunto without departing from the spirit, scope and inventive concepts. Accordingly, neither this patent nor the protection it provides should be limited to precise embodiments previously shown and described, but only to the full scope of the following claims.

What is claimed is:

1. A shaping tool comprising:
    a first handle having a jaw;
    a second handle having a jaw and pivotally joined to said first handle;
    a center block fixed to one of said jaws; and
    at least two bending blocks attached to the tool with at least one bending block eccentrically and releasably fixed to one of the first and second handles.

2. The tool of claim 1 wherein the at least one bending block eccentrically and releasably fixed is generally hexagonal.

3. The tool of claim 1 wherein a first bending block is eccentrically and releasably fixed to the first handle, and a second bending block is eccentrically and releasably fixed to the second handle.

4. The tool of claim 1 further comprising a bracing block.

5. The tool of claim 1 further comprising a straightening peg attached to the center block.

6. The tool of claim 1 further comprising a spreading knob on each handle.

7. A tool for shaping horseshoes comprising:
    a first handle having a first jaw;
    a second handle having a second jaw and pivotally attached to said first handle;
    a first bending block attached to said first jaw by a first bending block bolt passing through said first bending block at an off-center position;
    a second bending block attached to said second jaw by a second bending block bolt passing through said second bending block at an off-center position; and
    a bracing block fixed to one of said first and second jaws.

8. The tool of claim 7 wherein said bending blocks are hexagonal.

9. The tool of claim 7 further comprising a center block fixed to the second handle.

10. The tool of claim 9 further comprising a straightening peg attached to the center block.

11. The tool of claim 7 wherein said jaws are at least partially overlying.

12. The tool of claim 7 wherein said handles and jaws have generally flat upper and lower surfaces.

13. The tool of claim 12 wherein said first and second bending blocks and said bracing block are on the upper surfaces of the handles and jaws.

14. The tool of claim 12 further comprising a pair of spreading knobs on the lower surfaces of said jaws.

15. A tool for shaping a workpiece comprising:
    a right handle attached to a right jaw having a generally flat upper surface and a generally flat lower surface;
    a left handle attached to a left jaw having a generally flat upper surface and a generally flat lower surface;
    a center block fixed to said left jaw;
    a pivot pin passing through said center block and said right jaw thereby pivotally joining said right and left jaws;
    a hexagonal bracing block eccentrically bolted to said right jaw and spaced apart from said center block;
    a hexagonal right bending block eccentrically bolted to said right jaw and spaced apart from said center block and said bracing block; and
    a hexagonal left bending block eccentrically bolted to said left jaw and spaced apart from said right hexagonal bending block and said center block.

* * * * *